United States Patent [19]

Lee

[11] Patent Number: 4,513,501
[45] Date of Patent: Apr. 30, 1985

[54] COMBINED STORING AND SLICING DEVICE FOR A STICK OF BUTTER OR MARGARINE OR THE LIKE

[76] Inventor: Jong S. Lee, 800 Forest Ave., Westfield, N.J. 07090

[21] Appl. No.: 466,163

[22] Filed: Feb. 14, 1983

[51] Int. Cl.³ .............................................. A01J 19/00
[52] U.S. Cl. ...................................... 30/115; 30/116; 30/124; 83/651.1; 83/648
[58] Field of Search ...................... 83/651.1, 437, 648; 30/115, 124, 116

[56] References Cited

U.S. PATENT DOCUMENTS

| | | | |
|---|---|---|---|
| 656,745 | 8/1900 | Mivelaz | 83/651.1 |
| 2,580,864 | 1/1952 | Upright | 30/115 X |
| 2,813,336 | 11/1957 | Ackerman | 30/115 |
| 3,920,156 | 11/1975 | Hicks | 30/115 X |
| 3,974,539 | 8/1976 | Barouh et al. | 30/115 X |

Primary Examiner—Donald R. Schran
Attorney, Agent, or Firm—Auslander & Thomas

[57] ABSTRACT

A combined storing and slicing device is provided with a rectangular box-like container having one open shorter side through which a stick of butter or the like is received. A cutting line is held in a taut condition and is mounted for movement between a first rest position at the top of the open side and a second position at the bottom of the open side while traversing the open side. A cover is provided for the open side which retains the line in the second position when the cover is over the open side.

8 Claims, 4 Drawing Figures

COMBINED STORING AND SLICING DEVICE FOR A STICK OF BUTTER OR MARGARINE OR THE LIKE

BACKGROUND OF THE INVENTION

The present invention relates to a combined storing and slicing device for a stick of butter or margarine or the like.

One known device of this kind is disclosed in U.S. Pat. No. Des. 163,912. In this device, it is necessary to touch the contained stock of butter with one hand, while slicing with the other.

In another device shown in U.S. Pat. No. Des. 166,619, while it is not necessary to handle the butter stick, it is still necessary to use two hands to manipulate the device.

Moreover, both prior art devices must be used on a surface such as a counter top in order to effect slicing.

SUMMARY OF THE INVENTION

The main object of the present invention is to provide a device which eliminates the disadvantages of the prior art devices.

More specifically, the device according to the present invention may be manipulated with one hand, does not necessitate the handling of the butter and is capable of slicing the butter while held in the user's hand.

These and other objects and advantages of the present invention are achieved in accordance with the invention by a device comprising a rectangular box-like container having one open shorter side through which a stick of butter or the like is received, a cutting line such as a nylon cord or stainless steel wire and means holding the line in a taut condition. The holding means is mounted for the movement of the cutting line between a first rest position at the top of the open side and a second position at the bottom of the open side while traversing the open side. A cover is provided for the open side including means for retaining the line in the second position when the cover is over the open side.

The holding means comprises a frame mounted by an arm pivotally mounted at one end to the top wall of the container at the other shorter side and a spring biasing the arm upwardly and towards the other shorter side wall. The frame preferably has an inverted U-shape which is conjunction with the held line forms an aperture which is slightly larger than said open side and is alignable therewith when the line is in the second position.

A stop member extends from the top wall of the container at the open side for limiting the movement of the line to define the rest position thereof and the top wall of the container limits the movement of the frame to define the second position of the line.

The device also includes means for pushing a stick of butter or the like towards the open side, preferably including a first member in the container, preferably with pins projecting therefrom, a longitudinal slot in one longer side wall of the container and a second manually manipulatable member connected to the first member through the slot for sliding movement of the first and second members therealong.

In a preferred embodiment, indicia are provided on the outer surface of said one longer side wall for indicating incremental movements of the first and second members along said slot. A series of detents may alternatively be disposed on the outer surface of said one longer side and parallel to the slot, with a pawl member connected to the said second member and engageable with each of the detents.

Although such novel features believed to be characteristic of the invention are pointed out in the claims, the invention and the manner in which it may be carried out, may be further understood by reference to the description following and the accompanying drawings, wherein:

BRIEF DESCRIPTION OF THE DRAWINGS

FIG. 1 is a perspective view of the device according to the invention;

FIG. 2 is a shorter side view of the device of FIG. 1 with the cover off;

FIG. 3 is a shorter side view of the device of FIG. 1 with the cover on; and

FIG. 4 is a shorter side view of an alternative embodiment of the device according to the invention.

DETAILED DESCRIPTION OF THE INVENTION

Figures 1, 2, 3, 4:
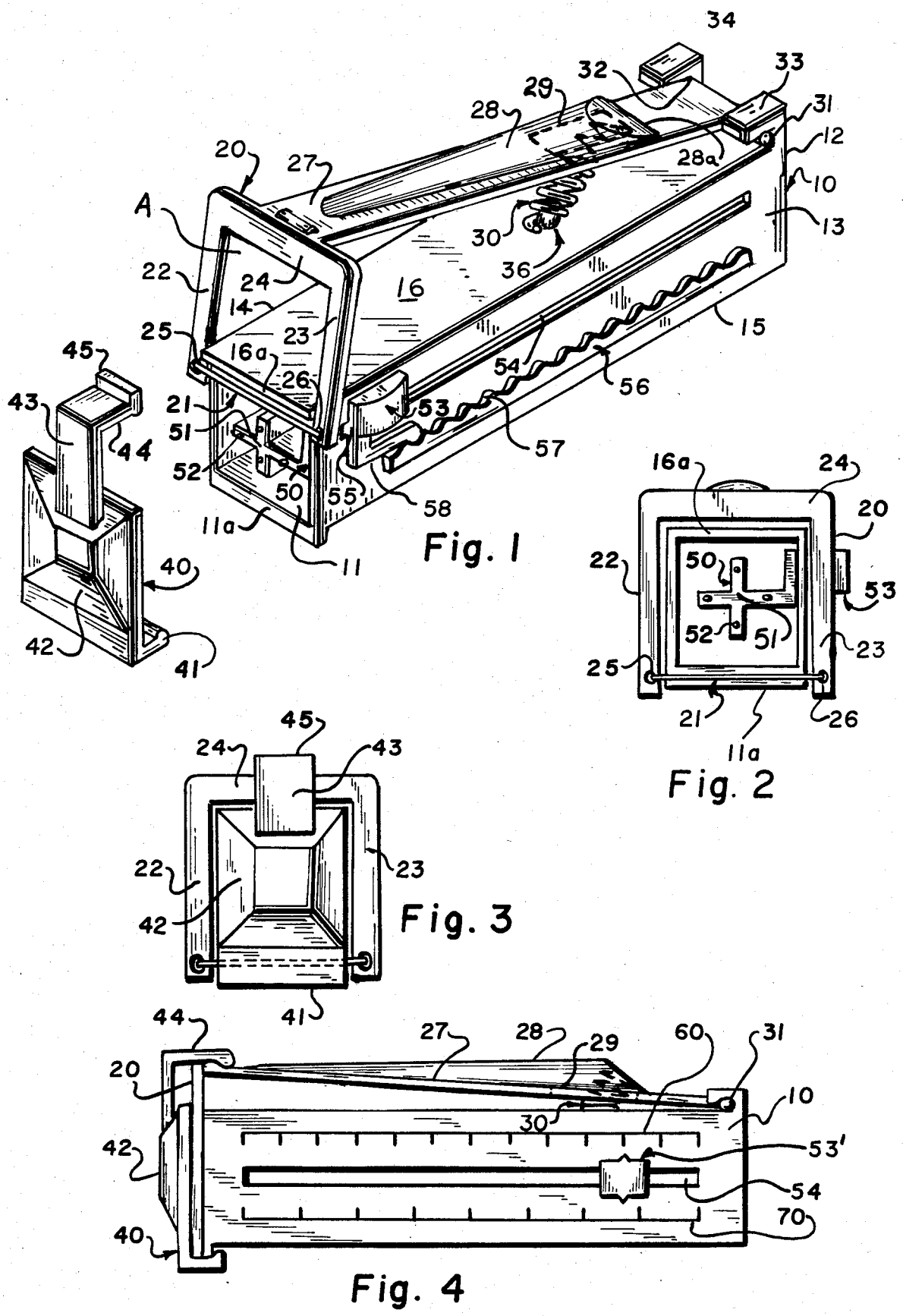

Referring now to the figures in greater detail, where like reference numbers denote like parts in the various figures.

FIGS. 1–3 show one embodiment of the invention including a rectangular box-like container 10 having one open shorter side 11, through which a stick of butter or margarine (not shown) can be received. The container 10 also includes another shorter side wall 12, two longer side walls 13, 14, bottom wall 15 and top wall 16.

In order to effect slicing, a cutting line 21 is provided and which is composed of nylon cord or stainless steel wire. The line 21 is held taut by holding means including an inverted U-shaped frame 20 having a base 24 and arms 22, 23 with mounting holes 25, 26 at the ends thereof. The frame 20 is mounted for pivotal movement between a first rest position (shown in FIG. 1) where line 21 is stopped by flange 16a and a second position at the bottom of the side 11 (shown in FIG. 2) while traversing side 11. The movement is effected by arm 27 fixed at one end to base 24 and having pivot pins 31, 32 at the other end that are slidably and rotatably received in L-shaped members 33, 34 connected to top wall 16. The arm 27 has aperture 29 therein and hollow member 28 fixed thereto with a back wall 28a. Top wall 16 also has a cylindrical projection 36 fixed thereto to mount spring 30 between projection 36 and wall 28a to bias arm 27 upwards and rearwards to side wall 12.

The bottom 15 is slightly raised from the horizontal by leg 11a and openside 11 is disposed at an angle of less than 15° to the vertical so that line 21 rubs against the ends of side walls 13, 14 during movement from the first to the second position.

The device also includes pushing means 50 including a pushing member 51 having projecting pin 52 and connected to a manually manipulatable member 53 via member 55 which slides freely in slot 54 in side wall 13. The member 53 has a pawl member 58 which is engageable in detents 57 of member 56 to define incremental movements of the member 51 and thus a stick of butter towards the open side 11.

The device is closable by cover 40 when the frame 20 is in the second position of FIG. 2 and the aperture A defined by frame 20 and line 21 is aligned with the open side 11. Cover 40 includes a square member 42 having a member 41 extending therefrom for mounting under foot 11a and a latching member 44 connected to member 42 via member 43 to coact with frame base 24 to maintain the cover 40 in place as well as retain frame 20 in the position shown in FIG. 3. Member 45 is provided to enable one to remove cover 40 from the FIG. 3 position.

In use, the device is removed from the refrigerator in the position of FIG. 3. The cover 40 is removed and the device assumes the position shown in FIG. 1. By moving member 56 one or two "clicks", a reproducible amount of butter or margarine will extend outwardly of the openside 11. By pressing down arm 27, line 21 will cut off the outwardly extending portion of butter.

As can be clearly seen, the above operations may be carried out with the entire device grasped in one hand, especially if repeated use is desired or if the cut piece is to be dropped into a pot or pan.

FIG. 4 shows an alternate embodiment wherein no detent is provided, however, indicia scales 60 and 70 are provided to indicate incremental movement of member 53' by teaspoons in scale 60 and tablespoons in scale 70.

It should be clear that all of the elements of the device except for spring 30 and line 21 can be composed of rigid plastic such as polypropylene or polyethylene.

It should be noted that the cylindrical projection 36 is angled rearward, thus retaining the spring 30 biased into the hollow member 28 against its back wall 28a. Thus, the spring 30 engages the pins 31 and 32 against the L-shaped members 33 and 34. The cutting line 21, at the same time, is also biased against the opening 11 for clean cutting. The flange 16a on the top wall also engages the cutting line 21 so that the entire cutting assembly is not likely to be involuntarily disengaged from the container of the present invention as it is held by the spring 30.

The terms and expressions which are employed are used as terms of description; it recognized though, that various modifications are possible.

It is also understood that the following claims are intended to cover all of the generic and specific features of the invention herein described and all statements of the scope of the invention which, as a matter of language, might fall therebetween.

What is claimed is:

1. A combined storing and slicing device comprising:
   a rectangular box-like container having a top, a bottom, two longer sides, a closed shorter side and an open shorter side through which a stick of butter or the like is received;
   a cutting line and means holding the line in a taut condition; and
   means mounting the holding means for movement of the cutting line between a first fast rest position at the top of the open side and a second position at the bottom of the open side while traversing the open side, said mounting means comprising an arm pivotally engaged at one end thereof to the top wall of the container at the closed shorter side and a spring biasing the arm upwardly and the cutting line against the peripheral wall of the said open shorter side.

2. A device according to claim 1 wherein a cover is provided for the open side including means coactive with the mounting means for retaining the line in the second position when the cover is over the open side.

3. The device according to claim 1, wherein the frame comprises an inverted U-shaped member which in conjunction with the held line forms an aperture which is slightly larger than said open side and is alignable therewith when the line is in the second position.

4. The device according to claim 3, wherein the mounting means further comprises a stop member extending from the top wall of the container at the open side for limiting the movement of the line to define the rest position thereof and wherein the top wall of the container limits the movement of the frame to define the second position of the line.

5. The device according to claim 1, further comprising means for pushing a stick of butter or the like towards the open side, wherein the pushing means comprises a first member in the container, a longitudinal slot in one longer side wall of the container and a second manually manipulatable member connected to the first member through the slot for sliding movement of the first and second members therealong.

6. The device according to claim 5, wherein the pushing means further comprises indicia on the outer surface of said one longer side wall for indicating incremental movements of the first and second members along said slot.

7. The device according to claim 5, wherein the pushing means further comprises a series of detent disposed on the outer surface of said one longer side and parallel to the slot and a pawl member connected to the said second member and engageable with each of the detents.

8. The device according to claim 5, wherein the first member has pins projecting therefrom for engaging a stick of butter or the like.

* * * * *